United States Patent [19]

Kelly

[11] 4,167,684

[45] Sep. 11, 1979

[54] MAGNETIC TORQUE MULTIPLIER

[76] Inventor: Donald A. Kelly, 58-06 69th Pl., Maspeth, New York, N.Y. 11378

[21] Appl. No.: 860,689

[22] Filed: Dec. 15, 1977

[51] Int. Cl.$^2$ ............................................. H02K 7/06
[52] U.S. Cl. ..................................... 310/80; 310/83; 310/103
[58] Field of Search ........................... 310/80, 83, 103

[56] References Cited

U.S. PATENT DOCUMENTS

| | | | |
|---|---|---|---|
| 968,574 | 8/1910 | Lecoche | 310/103 X |
| 1,084,148 | 1/1914 | Huguenin | 310/103 |
| 1,337,732 | 4/1920 | Stoller | 310/103 |
| 2,096,906 | 10/1937 | Lilja | 310/103 X |
| 2,243,555 | 5/1941 | Faus | 310/103 |
| 3,814,962 | 6/1974 | Baermann | 310/103 |
| 3,824,420 | 7/1974 | Steyeman et al. | 310/103 X |
| 4,082,969 | 4/1978 | Kelly | 310/80 X |

*Primary Examiner*—Donovan F. Duggan

[57] ABSTRACT

The magnetic torque multiplier consists of two basic components —one large flat wheel containing two opposite and off-set pole series of equally spaced rare earth/cobalt permanent magnets. The top series of permanent magnets—(N), are attractors, while the lower series—(S) are repellers, relative to corresponding magnet segments on the driving rotor.

The second component is the driving helical magnetic path rotor which has an "hourglass" or matching contour configuration with identical rare earth/cobalt permanent magnets equally spaced in a peripheral helical pattern around the driving rotor.

Both the driving rotor and driven wheel must be made of non-magnetic material, preferably aluminum and arranged as a non-contacting/-zero friction mechanical worm and worm wheel. A useful torque multiplication occurs at the wheel output shaft relative to the driving rotor input shaft, well above the normal torque step-up ratio—between the two components.

10 Claims, 4 Drawing Figures

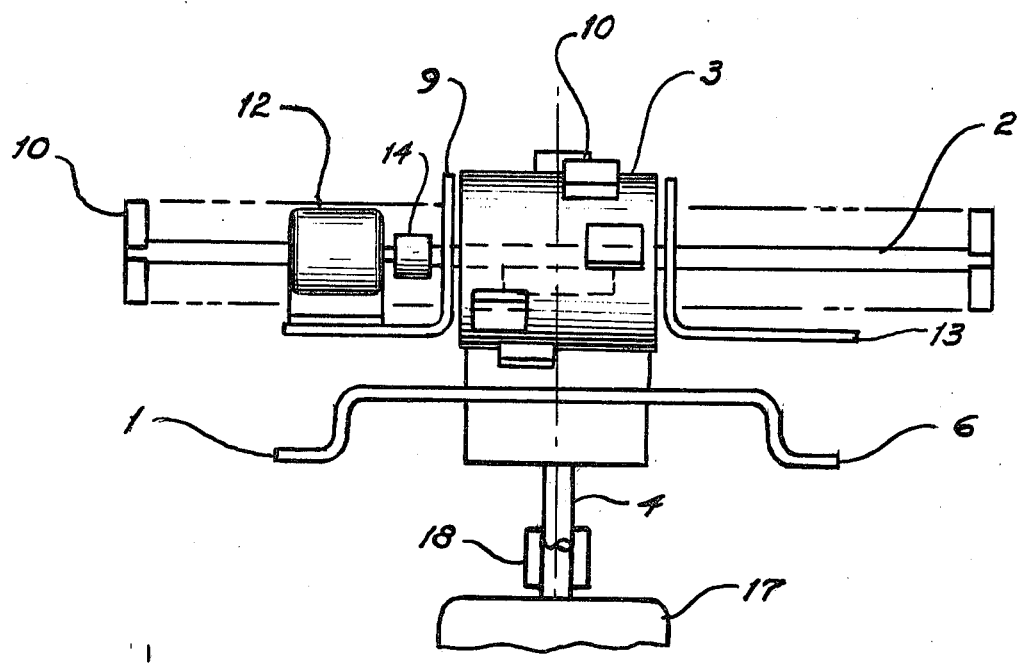
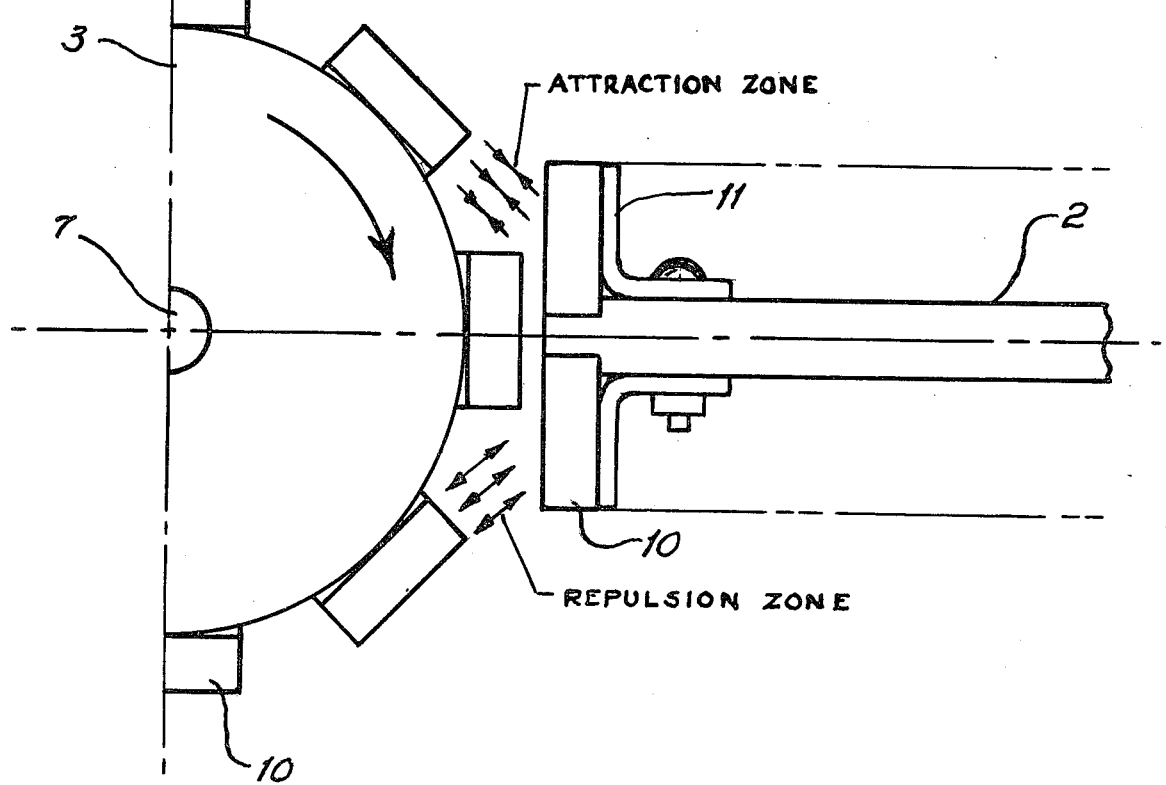

MAGNETIC TORQUE MULTIPLIER

BACKGROUND OF THE INVENTION

Numerous permanent magnet actuators, couplings and solenoid type motors have been advocated and built with the key objective of increasing the power output yield relative to the electrical power input, or magnetic advantage involved. Some of these devices consist of multiple permanent magnets which are shifted or revolved, mechanically or electrically, in such a way as to cause continuous rotation or reciprocation.

None of these various devices and arrangements have become commercially successful because of their generally low-speed/-torque output and relatively poor cost-/effectiveness. Since all of these devices are essentially low speed/torque units they cannot nearly compete with conventional high speed electric motors which are reliable and effective for practically all electrical power applications. Since electric motors can easily be designed for all sorts of starting, load and environmental conditions they have naturally gained wide market acceptance. The development of a practical and low cost solenoid type of magnetic motor which is superior to the best electric motors is quite unlikely, as the rare earth/cobalt permanent magnetic components come into wide use for conventional electric motors.

Various types of permanent magnet, magnetic motors have been evolved with most of the designs based on reciprocating discs and linkage, with alternating shields used to make and break the respective magnetic fields. All of these known reciprocating units are impractical because of very short and non-linear power strokes, low natural speed and cyclic torque output. Some of the rotary types of permanent magnet "motors" being advocated are nothing more than magnetic couplings since there is no direct and continuous magnetic leverage or torque stepup involved in their geometry.

Any type of rotating magnetic geometry in which the driven member-wheel can also drive the other member-rotor can only have the value of a magnetic coupling since there is no torque increase with the important element of a backstop or pawl action present. To be practical, any magnetic torque multiplier using permanent magnets must provide both uniform attraction and replusion from high force magnets on a small diameter rotor to a large diameter magnetic segmented wheel. The small rotor should require a minimum of input torque and the large wheel should not capable of back-revolving the small driving rotor.

The magnetic couple described has a mechanical counterpart in the standard worm and worm wheel, where a high speed worm drives a low speed wheel, and not visa-versa. For a single pitch worm there is a complete backstopping action on the wheel and a high mechanical advantage is produced.

Using the principle of the worm and worm wheel, a practical magnetic torque multiplier is possible with attractive prospects for a useful torque stepup due to alternate attraction and repulsion between the opposite magnetic segments, although the magnet sets are revolving at nearly right angles to each other, or exactly so.

When a permanent magnet, magnetic torque multiplier is arranged in this manner, with a small rare earth-/cobalt magnetic rotor revolving at a right angle to a large segmented rare-earth/cobalt magnetic wheel, and in-line with the plane of the wheel, then the geometry is attractive for achieving a practical magnetic torque multiplication unit. It is desirable to keep the magnet segment spacing close on the large wheel so that the the multiple magnets on the small driving helical rotor can displace the wheel magnet segments in small increments with a corresponding large magnetic force between the opposite magnet sets.

A magnetic torque multiplier differs from the concept of a magnetic motor in regard to a self-starting feature and input torque. A magnetic torque multiplier always requires a continuous input torque for the small driving rotor, while a magnetic motor should always be self-starting with continuous self-sustained operation.

The ideal magnetic torque multiplier provides a sizable and useful torque step-up at the large wheel based on the magnitude of the magnetic force between the opposite permanent magnet sets on each of the two revolving components. An added advantage for this manner of magnetic force transfer using individual, opposite magnetic segments is that no friction is imposed between the two components as in the case of the mechanical contacting worm and worm wheel counterparts. The helical magnetic rotor can run at high speed without surface contact, with a reduced-from-normal rated input torque due to alternating attraction and repulsion of the driven magnetic wheel acting on the rotor magnet segments. It is most desirable to use large and powerful rare earth/cobalt permanent magnets for both opposite sets of magnetic components to achieve a large torque output differential between the driver and driven shafts.

The major difference between this present magnetic torque multiplier—(M.T.M.) and the prior magnetic torque converter,—(M.T.C.) is that a second, lower series of permanent magnet segments have been added to the wheel, as necessary second repulsion phase for the driving rotor magnets in addition to the primary attraction phase. It is most important that the magnet segments have a uniform magnetic force, plus coercive force so that the torque input and output is smooth and continuous, without any choppy and erratic rotation.

There are several important power applications waiting to be filled with effective, high-power magnetic torque multipliers such as auxiliary home power supplies, and practical, low-cost electric vehicles. At the present time the progress in the development of practical electric vehicles is greatly impeded by lack of long-life, low-cost electric batteries. A high power-magnetic torque multiplier can bridge the gap caused by ineffective present batteries by providing a useful power step-up from current batteries to the electric drive motor of the vehicle, to improve overall electric vehicle operation and operating economics.

SUMMARY OF THE INVENTION

The magnetic torque multiplier is comprised of two rotating components, —one driving, small helical rotor fitted with identical rare earth/cobalt permanent magnets, which are equally spaced and form a continuous helical path around the rotor. The second component is a large, driven wheel which is fitted with corresponding equally spaced rare earth/cobalt magnets at the outside diameter/periphery, on both surfaces of the wheel. The (lower) series of P/M's is slightly offset in a uniform pattern around the circumference of the wheel in relation to the (upper) series of P/M's in order to cause an added torque vector for the wheel as the rotor P/M's repel each of the wheel's magnet segments.

It must be noted that the (lower) and (upper) series of P/M's are only relative terms since the driven wheel may operate in the vertical plane in which case the wheel magnet segments would be on either side of the wheel.

Because of there placement of two opposite magnetic pole series on both sides of the driven wheel, a toggle action zone is created as each driving rotor magnet segment approaches and passes the driven wheel plane. Although this toggle action zone is not desirable because it tends to produce a cogging or jumping effect on the rotor, it does produce the reduction in rated input torque for the driving rotor.

There is a definite continuous/-uniform "pull-push" effect on the driving rotor as each rotor magnet segment moves toward and passes through the wheel plane, due to the first attraction phase and second repulsion phase of the double series of wheel magnet segments.

Without the second "repelling" series of wheel magnet segments, the pull of the first series of wheel magnet segments must be broken by each rotor magnet segment, which tends to cancel out the first "attraction" phase, so that no reduction-from-normal input torque is possible with a single pole series of wheel magnet segments.

The second series of wheel repulsion magnet segments also adds to the wheel output torque since these wheel magnet segments are also repelled/reacted by each rotor magnet segment as they pass the driven wheel plane, due to the offset attitude of these segments in relation to the first series of wheel magnet segments.

The primary wheel torque is produced by the uniform displacement of the adjacent wheel magnet segments as they are influenced by the uniform lateral displacement of each magnet segment of the rotor's single pitch helical path.

Although the latest rare earth/cobalt permanent magnets are most desirable for the M.T.M. because of their very high energy product and coercivity factor, the cost of these latest P/M's is correspondingly very high. The use of Alnico V, VI, VII, or ceramic permanent magnets has not necessarily been ruled out for this application because of their competitive cost level and reasonable operating characteristics.

Since there is no practical size limitation to the construction of an M.T.M., the conventional Alnico or ceramic permanent magnets may be used to advantage, since they may be ganged together or selected and arranged for the best magnetic interaction. For a given input/output torque rating of a M.T.M., the permanent magnet cost will predominate the choice of the type of P/M selected, not necessarily the size of the M.T.M. unit.

The multiple permanent magnet segments arrayed with their common poles exposed as a single helical path around the peripheral surface of the rotor are known as—"inductors".

The (upper) series of P/M's are "attractors", while the (lower) series of P/M's are "repellers", relative to the corresponding, identical P/M's on the driving small rotor.

The two components,—the driving helical rotor and the large driven wheel are arranged in a "worm and worm-wheel" relationship, with the input and output shaft axes at right angles, or nearly so, to each other. It may be possible to gain some slight torque or speed advantage by having the two rotating components skewed at an angle other than ninety degrees which will be determined during continued development work.

It will be necessary to maintain close spacing, consistent with adjacent magnetic isolation, between the individual magnet segments on both the small driving rotor and large driven wheel to assure uniform segment displacement and an optimum dynamic magnetic force interaction between the two rotating components.

Each magnet segment may be directly bonded to a non-magnetic wheel component, or may be clamped onto the wheel with non-magnetic straps for ease of replacement and dynamic balancing. The large driven wheel must be rigid and rigidly mounted on large thrust-type ball bearings for rigid, low-friction rotation. Since the driving helical rotor will usually run at high speed, it is necessary to securely clamp on the magnet segments onto the non-magnetic helical rotor core, so that they may be slightly shifted, but locked in place, to maintain dynamic balance and retention, respectively.

The driving helical rotor may be in cylindrical, single pitch form, or an "hourglass"-matching contour form for multiple single pitch design depending on the magnitude of the output-torque requirements of the end application. The "hourglass"-matching contour driving rotor will provide a proportional increase in output torque due to the added number of rotor magnets which will influence the corresponding wheel magnet segments. As an example,—three helical loops of rotor magnets will nearly triple the torque output available at the wheel shaft.

The driving helical rotor must also be rigidly mounted on high quality ball bearings to restrain the reactions due to the dynamic magnetic interaction between the two magnetic components. The adjustable air gap of approximately 0.010 to 0.25 on the common centerline between the two rotating components must be held to this practical range in order to maintain the optimum interaction forces between the two sets of opposite revolving magnet segments.

Both the driving rotor core and matching driven wheel must be made from non-magnetic materials, preferrably aluminum, so that the magnetic interaction between the two components is not compromised in any way.

The permanent magnets selected for both rotating components must be uniformly identical and have the highest possible energy product or magnetic induction plus coercivity. Both of these magnetic properties, magnetic induction and coercive force will play a major role in determining the true end value of the M.T.M. At the present time the rare earth/cobalt permanent magnets offer the highest possible magnetic properties for this application, but their cost is very high. Since costs will also play a major role in the true value of the M.T.M's the magnets selected must show the highest possible cost/effectiveness ratio, along with the longest operating life.

Square or squarish, and flat rare earth/cobalt permanent-magnets are presently preferred for this application, and there is no theoretical limit to the size of both interacting components. A practical limit to the actual size of the components is imposed by weight and material cost restrictions, plus available space, but nearly any practical number or size of uniformly identical magnets may be used to make up the magnetic torque multiplier components.

The principal object of the invention is to provide the highest torque output for the large, driven wheel from the lowest possible torque input for the small helical rotor, as a useful power step-up means for many electrical generating applications.

Another object of the invention is to provide a step-up power source which can be produced at competitive costs, requires no combustible fuel and is non-polluting while running silently, and requires a minimum of parts replacement and maintenance.

It is a further object of the invention is to provide a natural energy source which has an extremely long operating life, with a maximum of operating effectiveness and component resistance to degradation.

The various features of the invention with its basic design geometry will be more apparent from the following description and drawings which illustrate the preferred embodiment. It should be understood that variations may be made in the specific components, without departing from the spirit and scope of the invention as described and illustrated.

Several Disclosure Documents have been filed with the Office which describe the totality and portions of this magnetic torque multiplier:

No. 056,006—Permanent Magnet Device—(Dec. 7, 1976.)
No. 064,353—Magnetic Torque Converter
No. 064,341—Compound Magnetic Torque Multiplier
No. 064,514—Magnetic Torque Multiplier.

REFERRING TO THE DRAWINGS

FIG. 3 is an external end view of the magnetic torque multiplier.

FIG. 4 is an enlarged local detail of the magnetic interaction between the magnetic rotor and wheel.

DESCRIPTION OF THE PREFERRED EMBODIMENT

Figure 1:
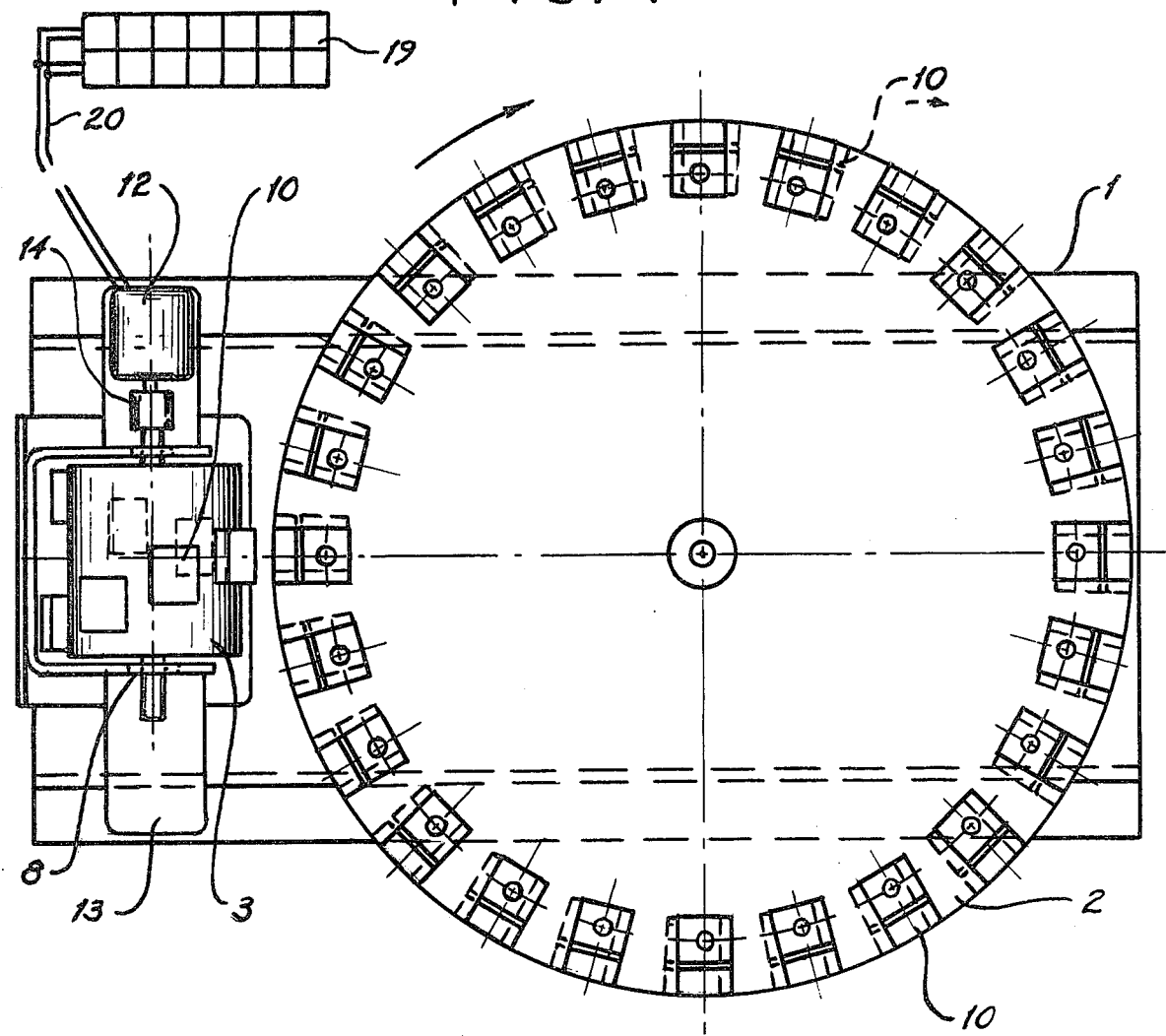
FIG. 1 is a top, external view of the magnetic torque multiplier.
Figure 2:
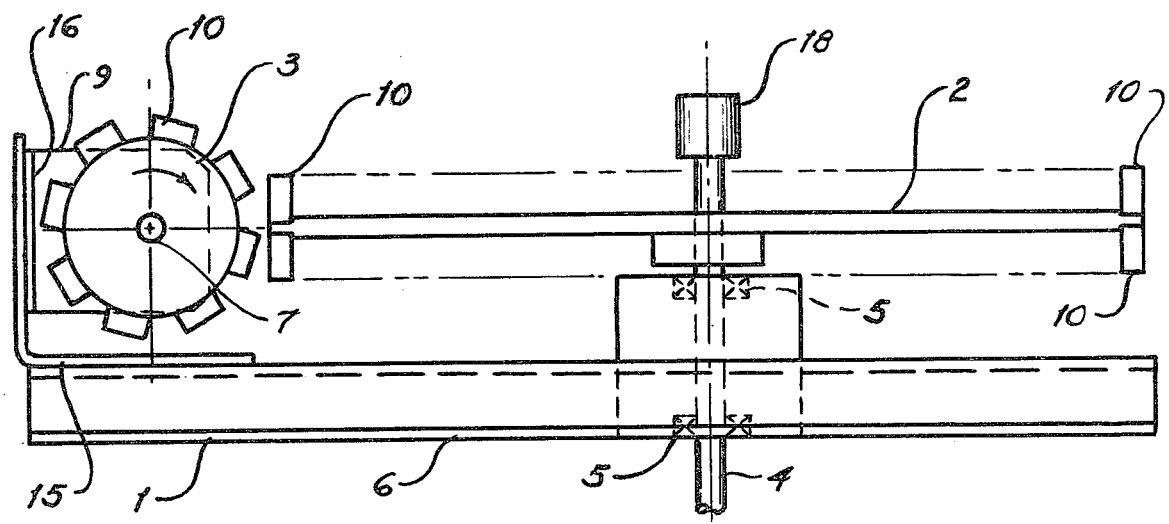
FIG. 2 is an external side view of the magnetic torque multiplier.

The magnetic torque multiplier 1, is comprised of two basic operating components which are the large, driven wheel 2, and the small, driving helical rotor 3, which correspond to, and are arranged as a worm and worm wheel mechanical drive unit. Both the small driving helical rotor 3, and the large driven wheel 2, are made of durable, non-magnetic materials.

A shaft 4, and ball bearings 5, within a mounting base 6, support the large, driven wheel 2, so that it revolves freely and transmits the output torque to the external load.

A shaft 7, and ball bearings 8, within a support bracket 9, support the small driving helical rotor 3, so that it revolves freely and transmits a continuous magnetic influence to the large, driven wheel 2.

Each magnet segment 10, is secured to the large, driven wheel 2, with non-magnetic clamps 11, and standard, non-magnetic hardware. The magnet segments 10. preferably of the rare earth/cobalt type are equally spaced around each of the outer diameter faces of the wheel 2, and held to a spacing distance which is closely equal to the pitch of the small, driving helical rotor 3. One face series of equally spaced magnet segments 10, is slightly offset, in relation to the opposite face series of magnet segments 10, around the circumference of the large wheel 2.

Each magnet segment 10, is secured to the peripheral surface of the small helical rotor 3, with non-magnetic clamps 11, and standard non-magnetic hardware. The magnetic segments 10, are equally and closely spaced around the rotor periphery and form a smooth helical path around the rotor, which has a pitch which matches the spacing between adjacent magnet segments 10, on the large driven wheel 2.

The small, driving helical rotor 3, may consist of multiple helical loops of magnet segments 10a, which are contoured to match the outer radius of the large, driven wheel 2, so that there are several rotor magnets 10a, influencing the same number of corresponding wheel magnet segments 10. The helical pitch of the multiple helical loop rotor 3, would be the same as a single helical magnetic loop rotor 3.

The pitch of both components, the small, driving helical rotor 3, and the large, driven wheel 2, will be determined by the optimum spacing allowed between adjacent magnet segments 10, on the large driven wheel 2, The small, driving helical rotor 3, is driven by any suitable small D.C. or A.C. electric motor 12, which is secured to extension mounts 13, at the support bracket 9. The electric motor 12 may be connected to either side of the shaft 7, by means of the coupling 14, to provide either direction of rotation for the small, driving helical rotor 3.

The support bracket 9, may be angularly rotated about the common magnetic centerline, at an angle other than ninety degrees between the axes of the two revolving components 2 and 3. The support bracket 9, can be tilted as required, and locked on the end bracket 15, which is secured to the mounting base 6. A series of corresponding holes 16, within both the support bracket 9, and the end bracket 15, allow the small, driving helical rotor 3, to be set at a right angle, (in the end view), or several other angles, in either direction, up to approximately twenty degrees.

Standard mounting hardware is fitted into the selected sets of corresponding holes 16, to securely lock the support bracket 9, to the end bracket 15.

Either end of the shaft 4, will be coupled to an electric alternator or generator 17, by means of the coupling 18, The electric motor 12, as a D.C. type, can be powered by an array of solar photovoltaic cells 19, which may be remote-located but exposed to direct solar radiation. Electrical leads 20, connect the solar cell array 19, to the D.C. electrical motor 12.

What is claimed is:

1. A magnetic torque multiplier comprised of two basic rotating components,
    a large flat non-magnetic wheel containing two series of equally spaced identical permanent magnets arrayed on each face of said flat non-magnetic wheel so that their opposite sets of common poles are exposed at the periphery, a slight uniform angular offset between each of said two
    series of equally spaced identical permanent magnets around the circumference of said large flat non-magnetic wheel,
    a driving cylindrical non-magnetic rotor containing multiple identical equally spaced permanent magnets arrayed so that their common poles are exposed as a single pitch helical path on the peripheral surface of said driving cylindrical non-magnetic rotor, arrangement of said large flat non-magnetic wheel and said driving cylindrical non-magnetic rotor on a common centerline with the rotating shaft axes at a right angle to each other, support means for said large flat non-magnetic wheel including an elongate base and shaft with ball bearings, support means for said driving cylindrical non-magnetic rotor comprised of support brackets and shaft with two ball bearings, securing of said support brackets onto said elongate base, securing and locking means for each of said equally spaced identical permanent magnets onto said large flat non-magnetic wheel and said driving cylindrical non-magnetic rotor, electric motor drive means for the shaft of said driving-cylindrical non-magnetic rotor, a coupling securing said electric motor drive means to said shaft of said driving cylindrical non-magnetic rotor, an alternator coupled to said shaft of said large flat non-magnetic wheel, multiple solar photovoltaic cells remotely connected to said electric motor drive means, connection of said multiple solar photovoltaic cells to said electric motor drive means with suitable multiple electric conduction wires.

2. A magnetic torque multiplier according to claim 1, in which said equally spaced identical permanent magnets are squarish and flat and made of rare earth cobalt materials, said equally spaced identical permanent magnets range in size and force from 16 to 18 BH max.$\times 10^6$ Gauss Oersteds as the normal peak energy product and have residual induction from 8,000 to 8,500 Gauss, a coercive force range of from 7,000 to 8,000 Oersteds, mounting of said multiple equally spaced identical permanent magnets with their flat faces exposed at the peripheries of said large flat non-magnetic wheel and said driving cylindrical non-magnetic rotor.

3. A magnetic torque multiplier according to claim 1, wherein said equally spaced identical permanent magnets arrayed on each face of said large flat non-magnetic wheel are arranged so the the top series of equally spaced identical permanent magnets have common north (N) poles exposed at the periphery, the bottom series of equally spaced identical permanent magnets have common south (S) poles exposed at the periphery, the said driving cylindrical non-magnetic rotor containing multiple identical equally spaced permanent magnets arrayed so that their common south (S) poles are exposed as a single pitch helical path on the peripheral surface of said driving cylindrical non-magnetic rotor, the top series of said equally spaced identical permanent magnets arrayed on the top face of said large flat non magnetic wheel are known as "attractors", the bottom series of said equally spaced identical permanent magnets arrayed on the bottom face of said large flat non-magnetic wheel are known as "repellers", said multiple identical equally spaced permanent magnets arrayed so that their common poles are exposed as a single pitch helical path on the peripheral surface of said driving cylindrical non-magnetic rotor are known as "inductors", the non-magnetic metal used for both said large flat non-magnetic wheel and said driving cylindrical non-magnetic rotor is an aluminum alloy which is anodized and of a suitable temper.

4. A magnetic torque multiplier according to claim 1, in which said large flat non-magnetic wheel is disposed in a vertical plane with said shaft axis on a horizontal line, said driving cylindrical non-magnetic rotor is disposed in a horizontal plane with said shaft axis on a vertical line, mounting of said support means for said large flat non-magnetic wheel including an elongate base onto a suitable vertical surface, standard hareware securing means for the mounting of said support means.

5. A magnetic torque multiplier according to claim 1, in which said equally spaced identical permanent magnets arrayed on each face of said large flat non-magnetic wheel are arranged with optimum adjacent spacing determined by a minimum of magnetic interaction between adjacent magnets, the optimum adjacent spacing becomes known as the pitch of said large flat non-magnetic wheel, the pitch of the large flat non-magnetic wheel is equal to the single pitch of said driving cylindrical non-magnetic rotor, the single pitch helical path on the peripheral surface of said driving cylindrical non-magnetic rotor is equal to the pitch of said large flat non-magnetic wheel.

6. A magnetic torque multiplier comprised of two basic rotating magnetic components, a large flat non-magnetic wheel containing two series of equally spaced identical permanent magnets arrayed on each face of said large flat non-magnetic wheel so that their opposite sets of north-south common poles are exposed at the periphery, a uniform angular offset between each of said two series of equally spaced identical permanent magnets around the circumference of said large flat non-magnetic wheel, a small diameter driving non-magnetic rotor of an "hourglass" contour form containing multiple identical equally spaced permanent magnets arrayed so that their common poles are exposed as a multiple helical path on the peripheral surface of said driving non-magnetic rotor, arrangement of said large flat non-magnetic wheel and said driving non-magnetic rotor on a common centerline with the rotating shaft axes at a right angle to each other, support means for said large flat non-magnetic wheel comprised of an elongate formed sheet metal base and shaft with two ball bearings of the thrust type, support means for said driving non-magnetic rotor comprised of support brackets and shaft with two ball bearings, securing of said support brackets onto said elongate formed-sheet metal base, securing and locking means for each of said equally spaced identical permanent magnets onto said large flat non-magnetic wheel and said driving non-magnetic rotor, A.C. electric moter drive means for the shaft of said driving non-magnetic rotor, a coupling connecting means for said driving non-magnetic rotor and said A.C. electric motor, a generator coupled to said large flat non-magnetic wheel.

7. A magnetic torque multiplier according to claim 6, in which said small diameter driving non-magnetic rotor of an hour-glass contour form matches the radius of said large flat non-magnetic wheel, the pitch of said small diameter driving non-magnetic rotor is single and matches the pitch-spacing between adjacent magnets on said large flat non-magnetic wheel, said small diameter driving non-magnetic rotor has a minimum of three helical continuous loops and a maximum of eight helical continuous loops.

8. A magnetic torque multiplier according to claim 6, in which said equally spaced identical permanent magnets are square and flat and made of conventional ceramic or Alnico magnetic materials, maximum permanent magnetic operating characteristics for each of said equally spaced identical permanent magnets.

9. A magnetic torque multiplier according to claim 6, wherein said equally spaced identical permanent magnets arrayed on on each face of said large flat non-magnetic wheel are arranged so that the top series of permanent magnets have common north (N) poles exposed at the periphery, the bottom series of equally spaced identical permanent magnets have common south (S) poles exposed at the periphery, the small diameter driving non-magnetic rotor of an hour-glass contour form containing multiple identical equally spaced permanent magnets arrayed so that their common south-(S) poles are exposed as a multiple helical loop path on the peripheral surface of said driving non-magnetic rotor.

10. A magnetic torque multiplier according to claim 6, in which said large flat non-magnetic wheel is disposed in a vertical plane with the shaft axis in a horizontal line, said driving non-magnetic rotor is disposed in a horizontal plane with the shaft axis in a vertical line, mounting od said support means for said large flat non-magnetic wheel onto a suitable vertical surface, said equally spaced identical permanent magnets arrayed on each face of said large flat non-magnetic wheel are arranged with optimum adjacent spacing determined by a minimum of magnetic interaction.

* * * * *